United States Patent
Sakamoto et al.

[11] Patent Number: 5,250,970
[45] Date of Patent: Oct. 5, 1993

[54] ELECTRONIC FLASHING APPARATUS AND CAMERA SYSTEM

[75] Inventors: Hiroshi Sakamoto, Kawasaki; Hideki Matsui, Yokohama, both of Japan

[73] Assignee: Nikon Corporation, Tokyo, Japan

[21] Appl. No.: 783,891

[22] Filed: Oct. 29, 1991

[30] Foreign Application Priority Data

Nov. 6, 1990 [JP] Japan ............... 2-115965[U]

[51] Int. Cl.⁵ ............................ G03B 15/03
[52] U.S. Cl. .............................. 354/149.1
[58] Field of Search ....................... 354/149.1

[56] References Cited

U.S. PATENT DOCUMENTS 4,743,929 5/1988 Taniguchi et al. ............... 354/149.1

Primary Examiner—David M. Gray
Attorney, Agent, or Firm—Shapiro and Shapiro

[57] ABSTRACT

An electronic flashing apparatus is provided with an adapter attachment detecting means for detecting the attachment of wide adapter, teleadapter, or the like, and a zoom position determining means for determining a zooming position on the basis of the detecting result from this adapter attachment detecting means and the focal length information from the photographing lens.

When the wide adapter is attached, the zooming position is shifted to the telescopic side, and when the teleadapter is attached, the zooming position is shifted to the wide angle side.

4 Claims, 2 Drawing Sheets

ELECTRONIC FLASHING APPARATUS AND CAMERA SYSTEM

BACKGROUND OF THE INVENTION

1. Field of the Invention

The present invention relates to an electronic flashing apparatus and camera system having an automatic zooming mechanism capable of modifying illuminating angles automatically by changing zooming positions.

2. Related Background Art

There has been traditionally an electronic flashing apparatus and camera system having an automatic zooming mechanism to modify illuminating angles automatically by changing the zooming positions of the flashing unit on the basis of the communication data from the camera, i.e., a focal length information from its photographing lens.

Meanwhile, there has been available a wide adapter or teleadapter as a device to change illuminating angles to the wide angle side or to the telescopic side.

Attempting to obtain flashing angles in a wide range by an automatic zooming mechanism results in a larger and heavier zooming mechanism, making its practicability deficient. Therefore, if illuminating angles beyond a variable range are required, a combined use of the wide adapter or teleadapter is considered.

Traditionally, there has been an electronic flashing apparatus capable of shifting its display of illuminating angles to the wide angle side without an automatic zooming mechanism but by interrelatedly working with a wide adapter attached thereto. In a case of an electronic flashing apparatus having an automatic zooming mechanism, it is possible to change the display of illuminating angles if the wide adapter or teleadapter is used.

However, in an electronic flashing apparatus having an automatic zooming mechanism, there is a problem that cannot be solved just by changing the display of illuminating angles when the wide adapter or teleadapter is combinably used.

More precisely, the fundamental objective of the automatic zooming mechanism in the electronic flashing apparatus is to set an appropriate illuminating angle automatically on the basis of the focal length information from the photographing lens. Nevertheless, if the wide adapter or teleadapter is attached, the illuminating angle based on the focal length information from the photographing lens is caused to be different from the actual illuminating angle, creating the following problem:

(1) In the case of a wide adapter to be attached.

When a wide adapter is attached, illuminating angles are shifted to the wide angle side, so that there occurs a trouble such as an eclipse. However, when the wide adapter is attached, the guide number is always lowered with the result that energy is wastefully consumed because not only the photographing distance is reduced in an area where no wide adapter is otherwise required but an amount of emission is increased. For example, let it be assumed that when an wide adapter is attached to an automatic zooming mechanism having illuminating angles corresponding to 24 to 85 mm, the illuminating angle becomes such as corresponding to 20 to 70 mm. Now, if a zoom lens of 20 to 35 mm is used for a photographing lens, it is necessary to attach a wide adapter when the focal length is less than 24 mm. However, no wide adapter is needed if the focal length is 24 to 35 mm, and in this range where no wide adapter is needed, such a problem as mentioned above is encountered.

(2) In the case of a teleadapter to be attached.

The problem is more serious when a teleadapter is attached. In this case, as the illuminating angles are shifted to the telescopic side, eclipse is generated, making it impossible to use any automatic zooming at all.

SUMMARY OF THE INVENTION

The present invention is designed to solve the aforesaid problems and an object thereof is to provide an electronic flashing apparatus and camera system, which enable a wide adapter or teleadapter to be efficiently used without any trouble even when the adapter is attached thereto.

An electronic flashing apparatus according to the present invention is provided with adapter attachment detecting means for detecting the attachment of an adapter such as wide adapter or teleadapter, and zoom positioning determination means for determining the zoom positioning on the basis of the detecting result of this adapter attachment detecting means and of the focal length information from the photographing lens.

Consequently, according to the present invention, when, for example, a wide adapter is attached, the zooming position is shifted to the telescopic side and a teleadapter, to the wide angle side; hence enabling apparatus to function efficiently without any problem even with the adapter being attached.

BRIEF DESCRIPTION OF THE DRAWINGS

The above-mentioned object of the present invention, and the manner of obtaining it, will become more apparent and the invention itself will be better understood by reference to the following description of an embodiment of the invention, taken in conjunction with the accompanying drawings, wherein.

DETAILED DESCRIPTION OF THE PREFERRED EMBODIMENTS

Now, an electronic flashing apparatus and camera system according to the present invention will be described in detail.

Figure 1:
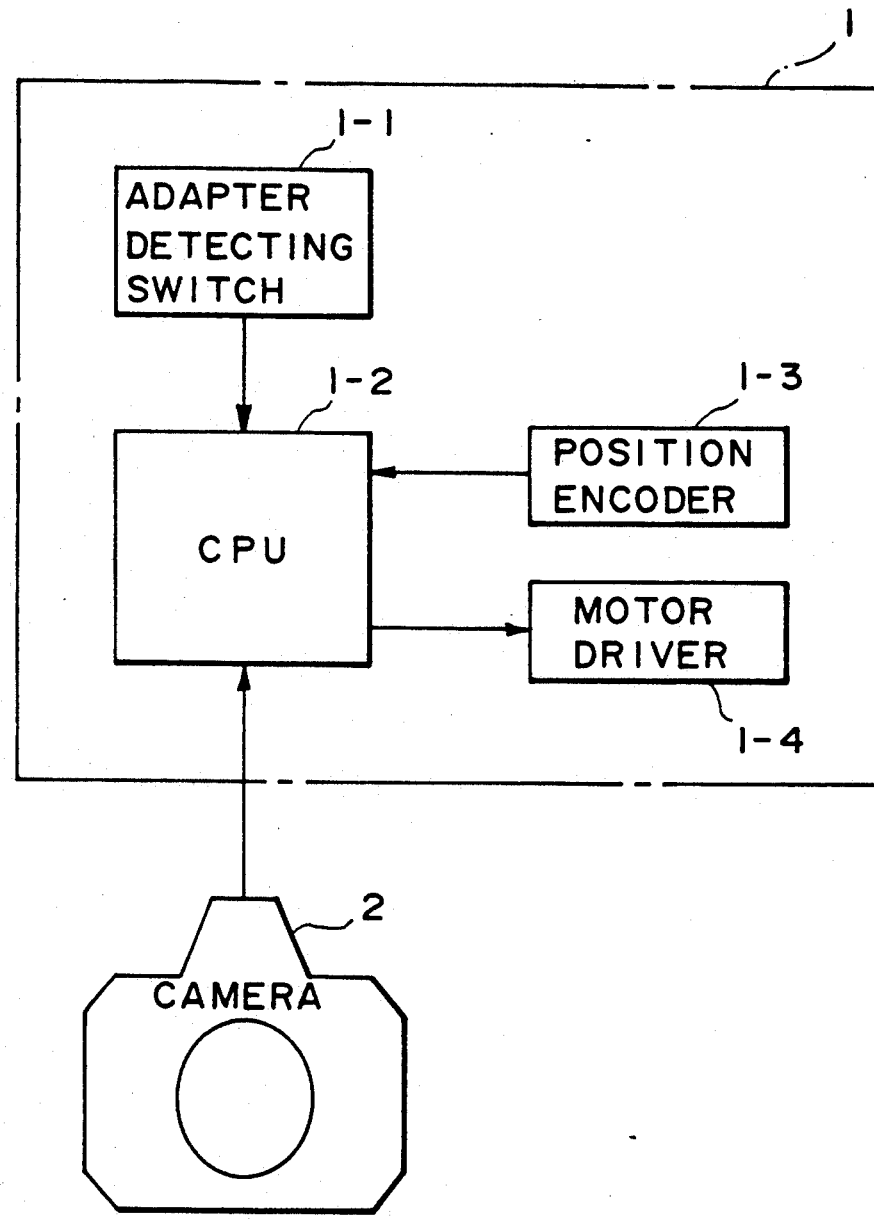
FIG. 1 is a block diagram illustrating the structure of an electronic flashing apparatus embodying the present invention.

FIG. 1 is a schematic block diagram showing an embodiment of the electronic flashing apparatus, in which a reference numeral 1 designates an electronic flashing apparatus and 2, a camera with this electronic flashing apparatus 1 mounted thereon. The electronic flashing apparatus 1 is provided with an adapter detecting switch 1-1, a CPU 1-2, a position encoder 1-3, and a motor driver 1-4.

With such a structure, the camera 2 transmits focal length information from its photographing lens to the electronic flashing apparatus 1. Also, in the electronic flashing apparatus 1, the CPU 1-2 is a central device for controlling the automatic zooming and outputs signals to the motor driver 1-4. Then, by a motor (not shown), a flashing unit (not shown) is zoomed. The position encoder 1-3 detects such a position of zooming to feed back the detecting result to the CPU 1-2. The adapter detecting switch 1-1 is a two-point contact switch to detect the attachment of the wide adapter and teleadapter, and if the wide adapter is attached, the first contact is closed. With the attachment of the teleadapter, the second contact is closed. Then, the CPU 1-2 discriminates the presence of the adapter and its kind on the basis of the input form the adapter detecting switch 1-1.

Figure 2:
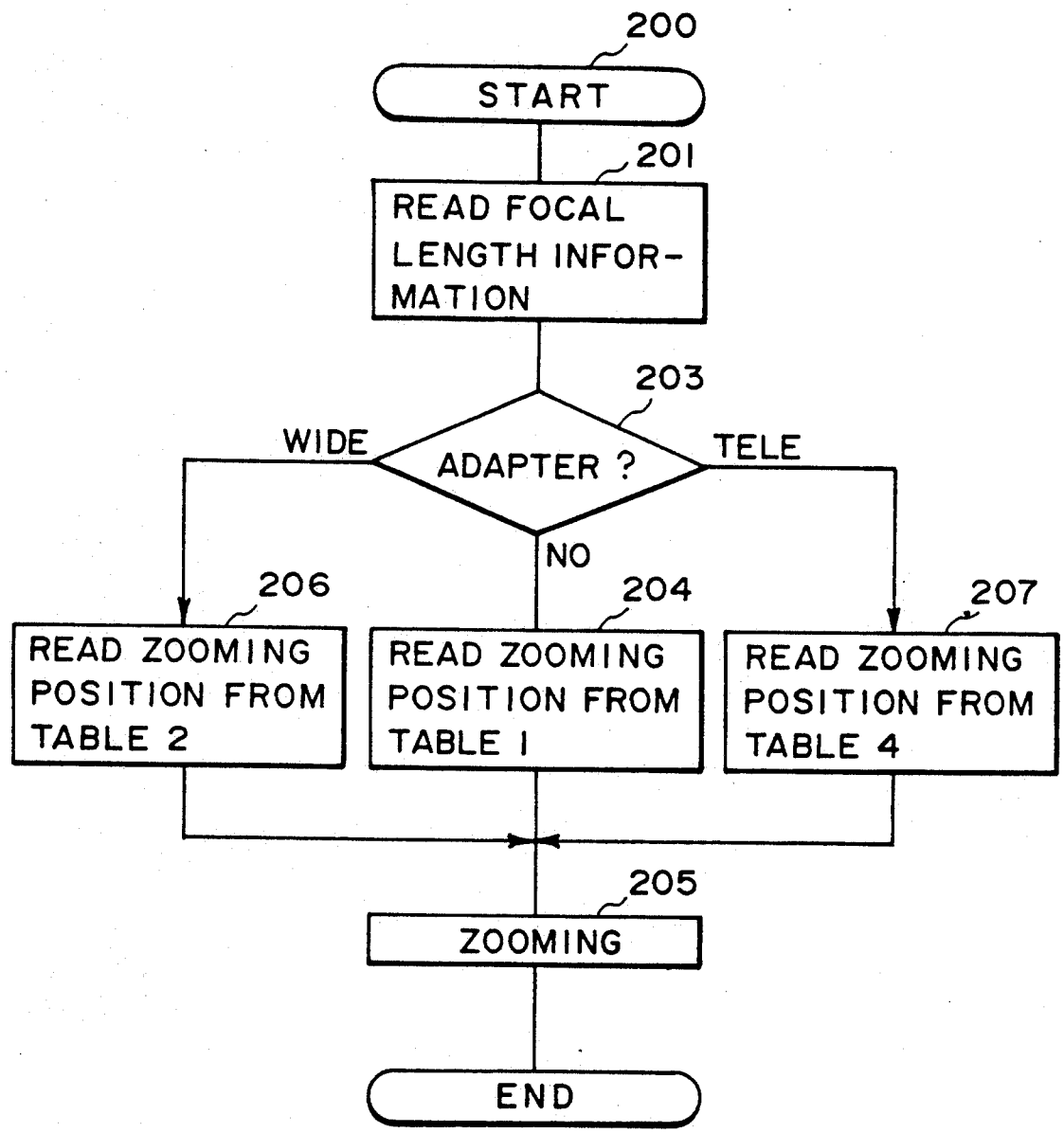
FIG. 2 is a flowchart illustrating the control operation of a CPU installed in the electronic flashing apparatus.

Now in accordance with a flowchart shown in FIG. 2, the control operation of the CPU 1-2 will be described.

At first, the description will be given of a case of an ordinary operation, i.e., where no adapter is attached to the electronic flashing apparatus 1.

When an automatic zooming operation is started (step 200), the CPU 1-2 reads focal length information being transmitted from the camera 2 (step 201). Then, it recognizes that there is no adapter attached (step 203) on the basis of the input from the adapter detecting switch 1-1. The process advances to the step 204. In the step 204, the CPU reads out of the table storing the contents shown in Table 1 a zooming position corresponding to the above-mentioned focal length information which has been read. Subsequently, the flashing unit is zoomed to the zooming position thus read (step 205). By this zooming of the flashing unit, the actual illuminating angle becomes as described in the supplementary note to the Table 1. In this respect, the numeral values in the Table represent the illuminating angles by the values corresponding to the focal lengths according to the established practice.

TABLE 1

| Focal length information from the camera | Zooming position | Illuminating angle | Remarks |
| --- | --- | --- | --- |
| 20 mm or more to less than 24 mm | 24 mm | 24 mm | eclipsed |
| 24 mm or more to less than 35 mm | 24 mm | 24 mm | |
| 35 mm or more to less than 50 mm | 35 mm | 35 mm | |
| 50 mm or more to less than 70 mm | 50 mm | 50 mm | |
| 70 mm or more to less than 85 mm | 70 mm | 70 mm | |
| 85 or more | 85 mm | 85 mm | |

As clear from the Table 1, the electronic flashing apparatus 1 according to the present embodiment has its zooming positions of illuminating angles to cover the angles of view for the photographing lens of 24, 35, 70, and 80 mm in the ordinary operation, and if, for example, a focal length information from the camera 2 is 28 mm, then its illuminated angle becomes 24 mm.

However, in the ordinary operation of the electronic flashing apparatus 1, when the focal length is less than 20 mm, the angle of view is too wide and the eclipse is generated even at the zooming position for the edge of the 24 mm wide angle. Therefore, in order to eliminate such eclipse, the wide adapter is attached to the electronic flashing apparatus 1.

Now, the description will be given of the operation when the wide adapter is attached to the electronic flashing apparatus 1.

When an automatic zooming operation is started (step 200), the CPU 1-2 reads focal length information being transmitted from the camera 2 (step 201). Then, it recognizes that an adapter is attached and that the attached adapter is a wide adapter (step 203) on the basis of the input form the adapter detecting switch 1-1. The process advances to the step 206. In the step 206, the CPU reads out of the table storing the contents shown in Table 2 a zooming position corresponding to the above-mentioned focal length information which has been read. Then, the flashing unit is zoomed to the zooming position thus read (step 205). By this zooming of the flashing unit, the actual illuminating angle becomes as described in the supplementary note to the Table 2.

In other words, according to the electronic flashing apparatus 1 of the present invention, its zooming position is shifted towards the telescopic side as compared with the zooming position in the ordinary operation with respect to the focal length information from the camera 2 in accordance with the stored table shown in Table 2.

This means that in the case of a wide adapter being attached, the illuminating angle becomes narrower than the photographing angle of view with respect to the photographing distance of the photographing lens which has been detected. As a result, an appropriate luminous distribution is obtained in the entire objective area.

TABLE 2

| Focal length information from the camera | Zooming position | Illuminating angle | Remarks |
| --- | --- | --- | --- |
| 20 mm or more to less than 24 mm | 24 mm | 20 mm | appropriate luminous distribution |
| 24 mm or more to less than 35 mm | 35 mm | 24 mm | |
| 35 mm or more to less than 50 mm | 50 mm | 35 mm | |
| 50 mm or more to less than 70 mm | 70 mm | 50 mm | |
| 70 mm or more to less than 85 mm | 85 mm | 70 mm | |
| 85 or more | 85 mm | 70 mm | |

The luminous distribution characteristics are shown in Table 3 as a reference in the case where the process advances to the step 204 instead of the step 206 when a wide adapter is attached. In other words, the luminous distribution characteristics obtainable when a wide adapter is attached to a conventional electronic flashing apparatus having an automatic zooming mechanism are stated in Table 3, the possibility of eclipse disappears in the focal length of less than 24 mm, but in the focal length of 24 mm or more, the illuminating angles become too wide and the photographing distances are reduced to increase the amount of emission, leading to the wasteful consumption of energy.

TABLE 3

| Focal length information from the camera | Zooming position | Illuminating angle | Remarks |
| --- | --- | --- | --- |
| 20 mm or more to less than 24 mm | 24 mm | 20 mm | Illuminating angles too wide |
| 24 mm or more to less than 35 mm | 24 mm | 20 mm | |
| 35 mm or more to less than 50 mm | 35 mm | 24 mm | |
| 50 mm or more to less than 70 mm | 50 mm | 35 mm | |
| 70 mm or more to less than 85 mm | 70 mm | 50 mm | |
| 85 or more | 85 mm | 70 mm | |

Thus, according to the electronic flashing apparatus 1 of the present embodiment, the eclipse generated in the focal length of less than 24 mm is eliminated when a wide adapter is attached Also, the problem encountered in the focal length of 24 mm or more is solved. Particularly, according to the electronic flashing apparatus 1 of the present embodiment, there is advantage that an appropriate illuminating angles can be obtained with the wide adapter being attached as it is when photographing with a zoom lens of 20 mm to 34 mm. In a conventional electronic flashing apparatus having a zooming mechanism, the wide adapter should be removed in order to obtain an appropriate luminous distribution in the focal length of 24 mm or more. This removal of the wide adapter is troublesome. In the electronic flashing apparatus 1 embodying the present invention, however, the zooming position becomes 50 mm to obtain an appropriate illuminating angle when photographing with a focal length of 35 mm, for example, with the wide adapter being attached.

Now the description will be given of the operation when a teleadapter is attached to the electronic flashing apparatus 1.

When an automatic zooming operation is started (step 200), the CPU 1-2 reads focal length information being transmitted from the camera 2 (step 201). Then, it recognizes that an adapter is attached and that the attached adapter is a teleadapter (step 203) on the basis of the input form the adapter detecting switch 1-1. The process advances to the step 207. In the step 207, the CPU reads out of the table storing the contents shown in table 4 a zooming position corresponding to the above-mentioned focal length information which has been read. Then, the flashing unit is zoomed to the zooming position thus read (step 205). By this zooming of the flashing unit, the actual illuminating angle becomes as described in the supplementary note to the Table 4.

TABLE 4

| Focal length information from the camera | Zooming position | Illuminating angle | Remarks |
| --- | --- | --- | --- |
| 20 mm or more to less than 24 mm | 24 mm | 35 mm | eclipsed |
| 24 mm or more to less than 35 mm | 24 mm | 35 mm | eclipsed |
| 35 mm or more to less than 50 mm | 24 mm | 35 mm | appropriate luminous distribution |
| 50 mm or more to less than 70 mm | 35 mm | 50 mm | |
| 70 mm or more to less than 85 mm | 50 mm | 70 mm | |
| 85 or more less than 105 mm | 70 mm | 85 mm | |
| 105 mm or more | 85 mm | 105 mm | |

According to the electronic flashing apparatus 1 of the present invention, its zooming position is shifted towards the telescopic side as compared with the zooming position in the ordinary operation with respect to the focal length information from the camera 2 in accordance with the stored table shown in Table 4, and the illuminating angles become wider than the photographing angles of view corresponding to the photographing distance of the detected photographing lens so as to obtain an appropriate luminous distribution in the telescopic side.

According to the electronic flashing apparatus 1 of the present invention, the eclipse is generated on the wide angle side when the teleadapter is attached This does not raise any problem in a state where the teleadapter is attached. The electronic flashing apparatus 1 of the present invention has already solved the problem that the automatic zooming mechanism cannot be used at all when a teleadapter is attached. For example, a teleadapter is attached for a highly frequent use of a 35 mm–135 mm zoom lens at the edge of the telescopic side. In this case, if the photographing angle of view is set at the edge of the wide angle side of 35 mm, then eclipse has been generated without fail in the conventional art. In the electronic flashing apparatus 1 of the present embodiment, however, the generation of eclipse is prevented by arranging the zooming position in the wide angle side of 24 mm.

Thus, according to the electronic flashing apparatus 1 of the present embodiment, it is possible to obtain appropriate luminous distributions in the focal length of 35 mm or more when a teleadapter is attached. Particularly, according to the electronic flashing apparatus 1 of the present embodiment, there is an advantage that an appropriate illuminating angle is obtained with the teleadapter being attached as it is when photographing with a zoom lens of 35 mm to 135 mm, for example. Whereas it is possible to obtain an appropriate luminous distribution in a focal length of less than 105 mm in a conventional electronic flashing apparatus if the teleadapter is removed, such a removal of the teleadapter is troublesome. According to the electronic flashing apparatus 1 of the present embodiment, however, the zooming position is set at 24 mm with the teleadapter being attached as it is when photographing in the focal length of 35 mm, for example.

In the above-mentioned embodiment, when the wide adapter or teleadapter is attached, a one-step portion of zooming positions is shifted. However, it is more preferable to set an appropriate amount of shifting in accordance with the degree of refraction of the wide adapter or teleadapter or the arrangement of the zooming positions. Also, instead of a simple shifting, it may be possible to shift the zooming position equivalently by modifying the region of the classification of the focal length information transmitted from the camera 2 or deciding on a zooming position in accordance with the result of data on the optimal modifying amount obtained by experiments.

Also, by evolving the above-mentioned embodiment, not only the attachment of the wide adapter or teleadapter is detected, but a wide adapter or teleadapter having a greater or smaller optical effect may also be used so that each of them may be discriminated in order to set the optimal shifting amount for each of the zooming positions.

Also, in the above-mentioned embodiment, while the attachment of the wide adapter and teleadapter is discriminated for recognition, an arrangement may be made so that the attachment of the wide adapter alone or that of the teleadapter alone can be limitedly recognized. In other words, the adapter detecting switch 1-1 may be arranged to be of a one-contact structure, and when the contact of this adapter detecting switch 1-1 is closed, an attached adapter is immediately recognized as a wide adapter, for example. Also, the kinds of adapters are not limited to the wide adapter or teleadapter, but various kinds of adapters capable of changing the illuminating angles may be conceivable. It may also be possible to make the number of recognitions more than two.

Further, in the above-mentioned embodiment, it is arranged that the focal length information is transmitted from the camera 2. The present invention is also applicable to the case where an adapter is attached to an electronic flashing apparatus for which zooming is manually set.

Also, in the above-mentioned embodiment, while the zooming position with respect to the focal length information is read from a stored table, it may be possible to obtain such a position by calculation instead.

Also, the present invention is not limited to a separate electronic flashing apparatus but is applicable to an electronic flashing apparatus incorporated in the camera.

Also, the present invention is not limited to the automatic zooming mechanism to set the zooming positions by a single step but is applicable to such a mechanism capable of selecting a position in highly multistep or infinite zooming positions.

Also, when a zooming position is indicated in a liquid crystal display or the like, the indicated value may be a value corresponding to the actual illuminating angle and not a value corresponding to the zooming position obtained by the automatic zooming mechanism.

As clear from the description set forth above, the electronic flashing apparatus according to the present invention shifts the zooming position to the telescopic side when a wide adapter is attached, for example, and shifts the zooming position to the wide angle side if a teleadapter is attached, hence making it possible to allow the system to function efficiently without any problem.

Furthermore, by the electronic flashing apparatus according to the present invention, it is unnecessary to detach the wide adapter or teleadapter from the camera each time of photographing particularly by the use of a zoom lens. Thus, the system is extremely easy to handle.

In this respect, while the structure shown in FIG. 1 is such that the electronic flashing apparatus is detachable, the present invention includes an electronic flashing apparatus which is incorporated in a camera.

What is claimed is:

1. An electronic flash apparatus having an automatic zooming mechanism capable of modifying illuminating angles automatically by changing zooming positions in response to focal length information from a photographing lens, comprising:

adapter attachment detecting means for detecting attachment of an adapter to said flash apparatus which further modifies said illuminating angles; and zoom position determining means for determining any one of a plurality of different zooming positions of said automatic zooming mechanism, with or without the adapter attached, in response to both the detecting result of said adapter attachment detecting means and the focal length information from the photographing lens.

2. An electronic flash apparatus according to claim 1, wherein said adapter attachment detecting means discriminates whether the attached adapter is for wide angles or not, and said zoom position determining means determines a zooming position corresponding to a narrower illuminating angle than that corresponding to a zooming position determined by the focal length information above, when attachment of an adapter for wide angles is detected.

3. An electronic flash apparatus according to claim 1, wherein said adapter attachment detecting means discriminates whether an attached adapter is for telescopic angles or not, and said zoom position determining means determines a zooming position corresponding to a wider illuminating angle than that corresponding to a zooming position determined by the focal length information alone, when attachment of an adapter for telescopic angles is detected.

4. A camera system having an electronic flash apparatus for emitting flash light toward an object, having the following:

adjusting means for adjusting the illuminating angle for the flash light emission;

detecting means for detecting attachment of an adapter to said electronic flash apparatus for modifying the illuminating angle adjusted by said adjusting means;

means for reading focal length information of a photographing lens; and control means for controlling said adjusting means for adjusting the illuminating angle to any one of a plurality of different illuminating angles, with or without the adapter attached, in response to both the read focal length information and the detecting result of said detecting means.

* * * * *